April 7, 1953  E. F. KOERBER  2,633,975
LATERAL BEND CONVEYER
Filed July 13, 1951  3 Sheets-Sheet 2
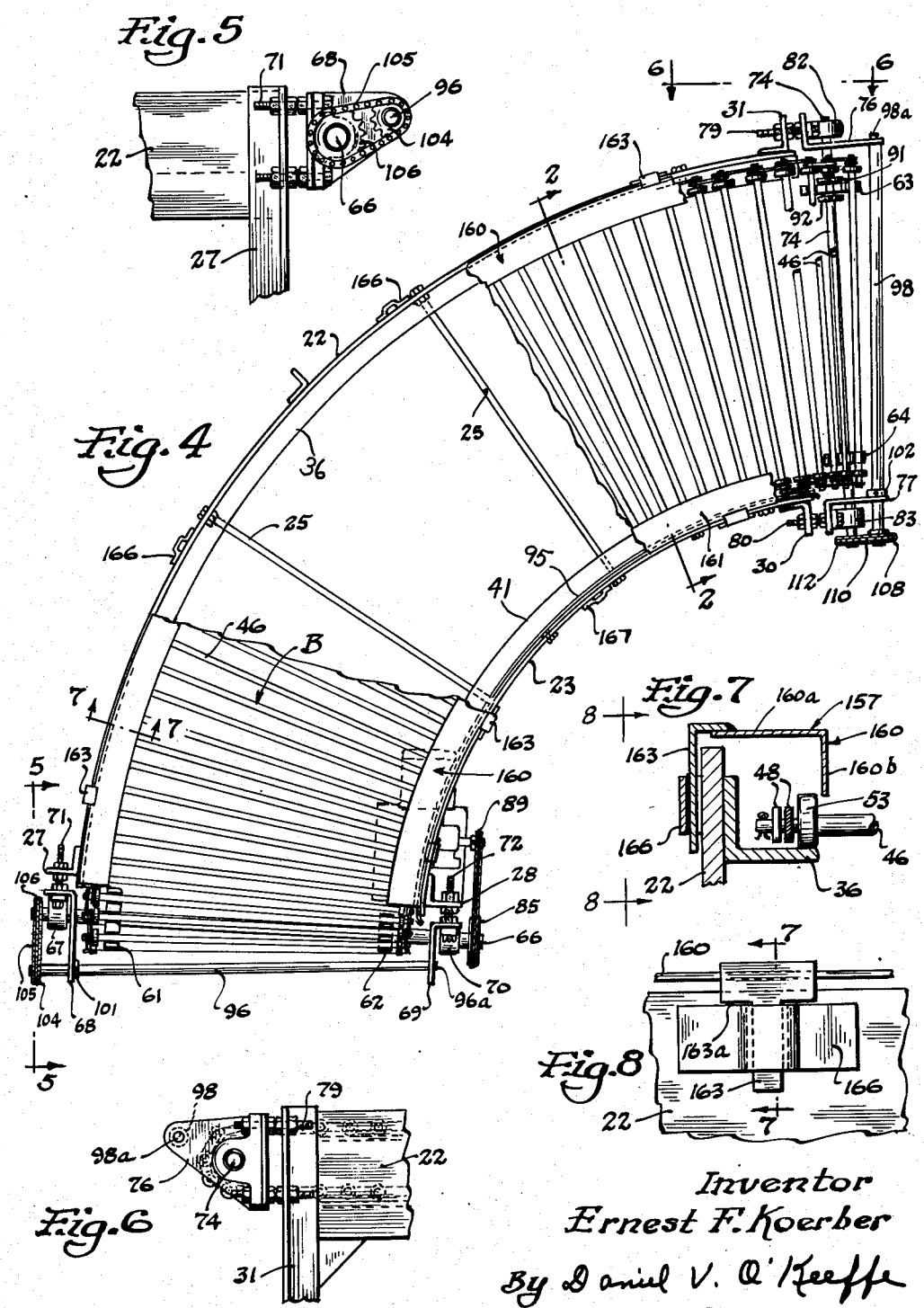
Inventor
Ernest F. Koerber
By Daniel V. O'Keeffe
Attorney April 7, 1953   E. F. KOERBER   2,633,975
LATERAL BEND CONVEYER
Filed July 13, 1951   3 Sheets-Sheet 3
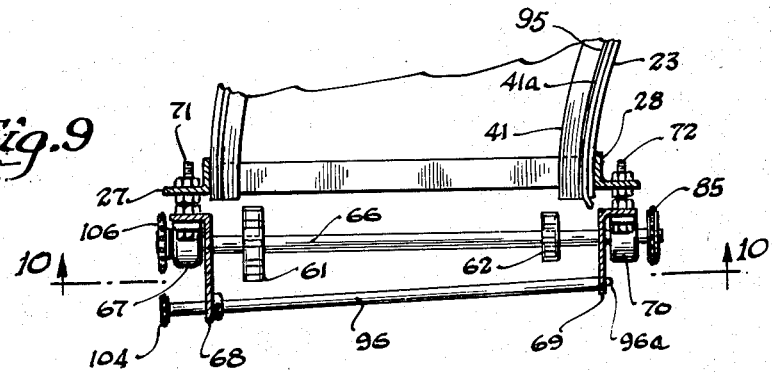
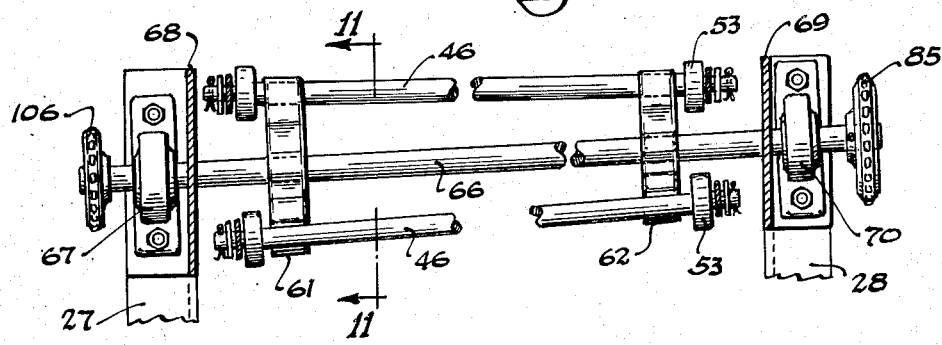
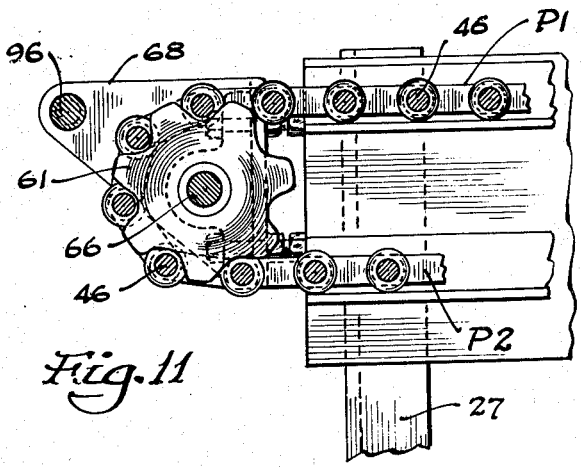
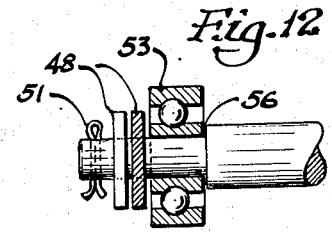
Inventor
Ernest F. Koerber
By Daniel V. O'Keeffe
Attorney Patented Apr. 7, 1953

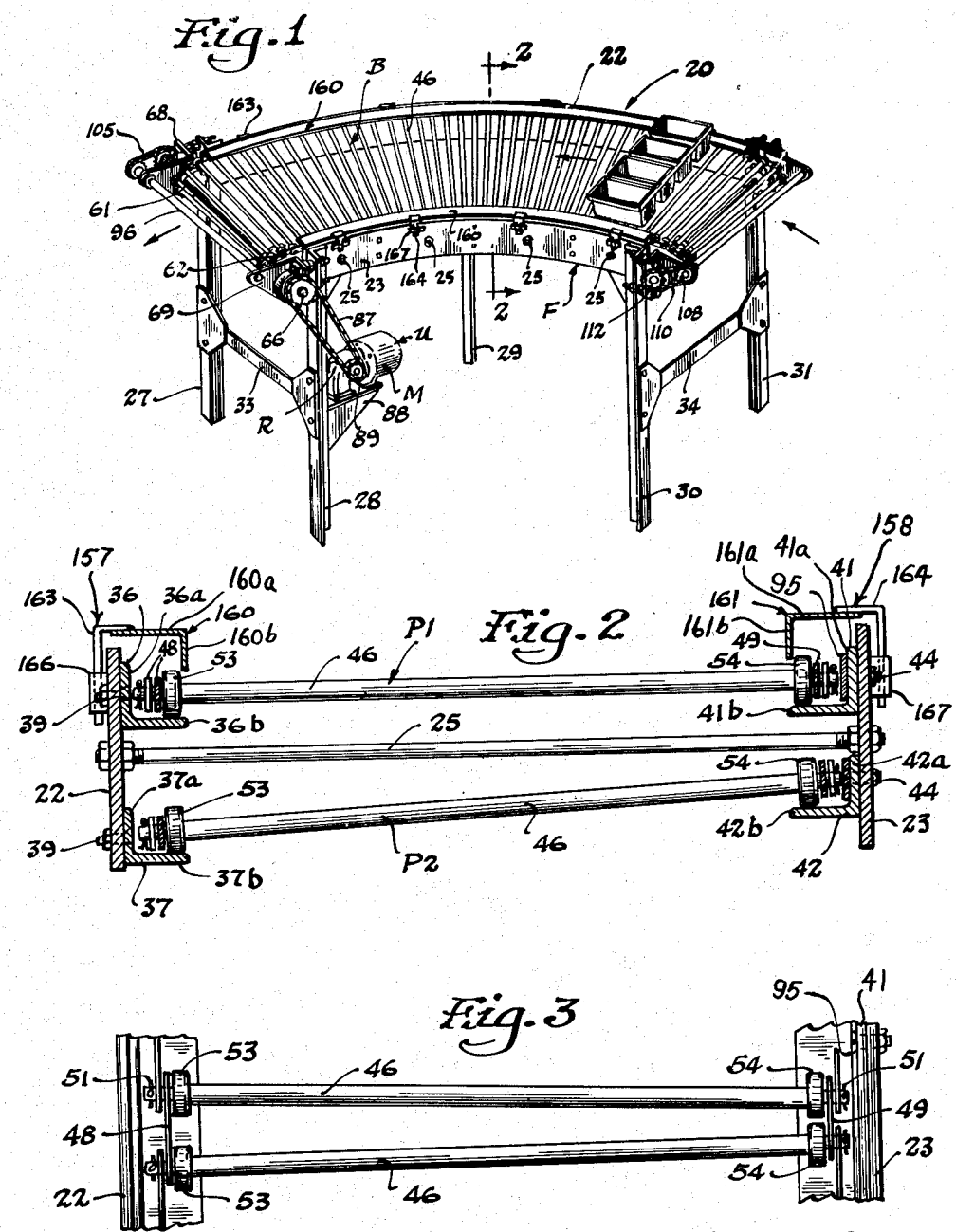

2,633,975

UNITED STATES PATENT OFFICE 2,633,975

LATERAL BEND CONVEYER

Ernest F. Koerber, Chicago, Ill.

Application July 13, 1951, Serial No. 236,549

5 Claims. (Cl. 198—182)

This invention relates to conveyors and more particularly to conveyors of the type known in the art as belt conveyors.

It is a primary object of my invention to provide a conveyor which is particularly well adapted for use in bakeries and the like, for conveying bread and the like, around a corner in a conveyor system in a novel and expeditious manner.

A further object of my invention is to provide a conveyor of the aforementioned type wherein the passes of the conveyor belt are supported in a novel and expeditious manner whereby wear of the conveyor belt and of the supporting parts is minimized.

Another object is to provide a novel conveyor embodying a conveyor belt having cross-rods and wherein the cross-rods are directly engaged by sprocket wheels for driving the belt in a novel and expeditious manner.

A further object of my invention is to enable a novel curved conveyor of the aforementioned type to be constructed which embodies a novel conveyor belt which is supported and driven in a novel and expeditious manner whereby the articles to be conveyed around the corner thereby are maintained in properly spaced relation during the conveying thereof and the pass of the conveyor belt on which the articles are conveyed is maintained in substantially a horizontal plane.

Yet another object is to afford a novel conveyor of the aforementioned type wherein the articles to be conveyed thereby are fed onto and off from the conveyor belt in a novel and expeditious manner whereby the proper spaced relation of the articles to each other is maintained at all times.

Another object of my invention is to provide a conveyor of the aforementioned type which is efficient in construction and operation, may be readily maintained, and may be economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view of a conveyor embodying the principle of my invention;

Fig. 2 is a sectional view taken substantially along the line 2—2 in Fig. 1;

Fig. 3 is a detail top plan view of a portion of the conveyor shown in Fig. 1;

Fig. 4 is a top plan view of the conveyor shown in Fig. 1, with certain parts thereof broken away to show the underlying mechanism;

Fig. 5 is a detail elevational view taken substantially along the line 5—5 in Fig. 4;

Fig. 6 is a detail elevational view taken substantially along the line 6—6 in Fig. 4;

Fig. 7 is a detail sectional view taken substantially along the line 7—7 in Fig. 4;

Fig. 8 is a detail elevational view taken substantially along the line 8—8 in Fig. 7;

Fig. 9 is a detail sectional view of a portion of the conveyor shown in Fig. 4, and looking in the same direction;

Fig. 10 is a detail sectional view taken substantially along the line 10—10 in Fig. 9;

Fig. 11 is a detail sectional view taken substantially along the line 11—11 in Fig. 10; and Fig. 12 is a detail sectional view of a portion of the mechanism shown in Fig. 10.

A conveyor 20 is shown in the drawings to illustrate a preferred embodiment of my invention. The conveyor 20 comprises in general, Fig. 1, a supporting frame F of substantially arcuate shape on which is mounted for movement in a substantially horizontal direction, a conveyor belt B, the conveyor belt being driven by a suitable power unit U, all of which will be described in greater detail hereinafter.

The supporting frame F, Figs. 1, 2 and 4 includes two substantially parallel, arcuate shaped side rails 22 and 23 secured to each other in spaced relationship by means of tie-rods or brace rods 25 extending therebetween. The side rails 22 and 23 are supported in horizontally extending elevated position by legs 27, 28, 29, 30 and 31, the upper end portions of the legs 27, 29 and 31 being welded to the side rail 22 and the upper end portions of the legs 28 and 30 being welded to the side rail 23, with the legs 27 and 28 disposed at one end of the conveyor 22, and the legs 30 and 31 disposed at the other end thereof, and the leg 29 being disposed substantially midway between the ends of the conveyor 22.

Suitable cross braces 33 and 34, Fig. 1, extend between and are secured to the legs 27 and 28, and the legs 30 and 31, respectively, to reinforce the supporting structure of the supporting frame F.

Two elongated angle brackets 36 and 37, Fig. 2, having vertical legs 36a and 37a, and horizontally extending legs 36b and 37b, respectively, are removably mounted on the inner face of the side rail 22 by suitable means, such as, bolts 39 extending through the vertical legs 36a and 37a and the side rail 22, whereby they may be readily removed and replaced as desired. The horizontal legs 36b and 37b of the brackets 36 and 37 project horizontally inwardly from the side rail 22 in parallel planes with the leg 36b disposed above the leg 37b.

Similarly, two elongated angle brackets 41 and 42, having vertical legs 41a and 42a, and horizontal legs 41b and 42b, respectively, are removably mounted on the inner face of the side rail 23 by suitable means, such as, bolts 44 extending through the legs 41a and 42a and the side rail 23, whereby they may also be readily removed and replaced as desired. The horizontal legs 41b and 42b of the brackets 41 and 42 project horizontally inwardly from the side rail 23 in parallel planes with the leg 41b disposed above the leg 42b.

As is best seen in Fig. 2, the legs 36b and 41b of the angle brackets 36 and 41 are disposed in substantially the same horizontal plane and project inwardly toward each other from respective side rails 22 and 23, these members affording track ways for supporting the upper pass P1 of the belt B, as will be described in greater detail presently. Also, as is best seen in Fig. 2 the angle brackets 37 and 42 are disposed below and substantially parallel to the angle brackets 36 and 41, respectively, with the horizontal flange 37b of the angle bracket 37 disposed in a plane parallel to but below the plane of the horizontal leg 42b of the angle bracket 42. These latter mentioned horizontal flanges 37b and 42b afford tracks for supporting the lower pass P2 of the belt B, as will be described in greater detail presently.

The belt B, Figs. 1, 2, 3 and 4 is of the elongated endless type embodying a plurality of cross rods 46 disposed transversely to the length of the belt B and secured together at the opposite ends thereof by links 48 and 49 with adjacent cross rods disposed in spaced relation to each other. The corresponding ends of each pair of adjacent rods 46 are secured together by individual links 48 and 49 respectively, pivotally mounted on the respective ends of that pair of rods and retained thereon by suitable means, such as cotter pins 51. The links 48 are disposed on the end portions of the rods 46 at the outer or heel side of the curve of the belt B. The links 49 are disposed on the end portions of the rods 46 at the inner or throat side of the curve of the belt B. Two roller bearings 53 and 54 are mounted with a press fit on each of the cross rods 46, at respective ends thereof, the bearing 53 being disposed inwardly of but adjacent to the links 48 and the bearing 54 being disposed inwardly of but adjacent to the links 49. The end portions of the rods 46 on which the links 48, 49 and the bearings 53 and 54 are mounted, are reduced in cross section to afford shoulders 56, Fig. 12, limiting the inward movement of the bearings 53 and 54 on the rods 46.

The belt B is mounted between the side rails 22 and 23 in substantial conformity to the arcuate shape thereof as is best seen in Fig. 4. The rollers 53 and 54 on the cross rods 46 of the upper pass P1 of the belt B rest on and are movable along the upper face of the flanges 36b and 41b, respectively, of the angle brackets 36 and 41. The rollers 53 and 54 on the cross rods 46 of the lower pass P2 rest on and are movable along the upper face of the horizontal flanges 37b and 42b of the angle brackets 37 and 42. As best seen in Fig. 2 the brace rods 25, extending between the side rails 22 and 23, are disposed between the two passes P1 and P2 of the belt B.

Two covers 157 and 158, Figs. 1, 2, 7 and 8, comprising two elongated angle-members 160 and 161 having tongues 163 and 164 projecting therefrom, respectively, are mounted on the side rails 22 and 23, respectively, in overlying spaced relation to the adjacent lateral edge portions of the conveyor belt B. The angle members 160 and 161 are formed of suitable material such as steel and have horizontally disposed legs 160a and 161a, and vertically disposed legs 160b and 161b projecting downwardly from the inner edges of the legs 160a and 161a, respectively. The free end portions of the tongues 163 and 164 are disposed in substantially parallel relation to the legs 160b and 161b and are mounted in suitable brackets 166 and 167 welded to the outer face of the side rails 22 and 23, respectively. The tongues 163 and 164 have shoulders 163a and 164a, which, when the tongues 163 and 164 are mounted in the brackets 166 and 167 rest on the top thereof and support the covers 157 and 158 in spaced overlying position to the upper edge of the side rails 22 and 23.

When the covers 157 and 158 are disposed in operative position on the side rails 22 and 23, respectively, the legs 160b and 161b thereof are disposed inwardly of, but adjacent to the rollers 53 and 54, respectively, on the upper pass P1 of the belt B and thereby afford bumpers protecting the rollers 53 and 54 from being struck by work pieces fed onto and off from the conveyor 22. The covers 157 and 158 may be readily removed from the conveyor 22 for the purpose of cleaning the tracks 36 or 37, or to gain access to the lateral edge of the belt B for any purpose, by merely lifting vertically thereon. Likewise, the covers 157 and 158 may be readily mounted in position on the side rails 22 and 23 by merely lowering them into proper position with the tongues 163 and 164 disposed in the brackets 166 and 167, respectively.

As is best seen in Figs. 3 and 4, the links 48 interconnecting the ends of adjacent rods 46 at the heel side of the conveyor 20 are substantially longer than the links 49 connecting the ends of adjacent cross rods 46 at the throat side of the conveyor 20. Thus, it will be seen that adjacent cross rods 46 flare outwardly away from each other from the throat side of the conveyor 20 to the heel side thereof, with the rods 46 being disposed substantially radially of the curve of the conveyor 20.

The belt B is trained over four sprocket wheels 61, 62, 63 and 64, Fig. 4. Two of the sprocket wheels 61 and 62 are mounted on a drive shaft 66 which extends through brackets 68 and 69, Figs. 4 and 5, mounted on the legs 27 and 28 by bolts 71 and 72, respectively, at the head end of the conveyor 20 in substantially outwardly projecting alignment with adjacent ends of the side rails 22 and 23, respectively, the opposite end portions of the shaft 66 being journaled in bearings 67 and 70 mounted on the brackets 68 and 69. The other two sprocket wheels 63 and 64 are mounted on a drive shaft 74 which extends through brackets 76 and 77, Figs. 4 and 6, mounted on the legs 31 and 30, respectively, by bolts 79 and 80, respectively, at the tail end of the conveyor 20 in substantially outwardly projecting alignment with the side rails 22 and 23, the opposite end portions of the shaft 74 being journaled in bearings 82 and 83 mounted on the brackets 76 and 77, Fig. 4.

Each of the sprocket wheels 61—64 have the same number of teeth therein. However, it will be seen that the sprocket wheels 61 and 63, which are of equal size, are considerably larger in diameter than the sprocket wheels 62 and 64 which are likewise equal in size. The belt B is trained over the sprockets 61—64 with the cross bars 46 disposed in the spaces between the teeth of the sprocket wheels 61—64, the cross bars 46 being so spaced from each other that adjacent cross bars are directly engaged between adjacent pairs of teeth on the sprocket wheels 61—64 during movement of the belt B over the sprocket wheels.

The drive shafts 66 and 74, on which the sprocket wheels 61 and 62, and the sprocket wheels 63 and 64, respectively, are mounted are disposed at an angle to the horizontal between the brackets 68 and 69 and 76 and 77, respectively, to thereby dispose the upper peripheral edge portions of the sprocket wheels 61—64 in the same horizontal plane. Thus, it will be seen that those cross rods 46 which afford the upper pass P1 of the belt B between the sprocket wheels 61 and 62, and the sprocket wheels 63 and 64 are disposed in a substantially horizontal common plane, whereas the cross rods 46 affording the pass P2 of the belt B between the sprocket wheels 61 and 62 and the sprocket wheels 63 and 64 are disposed in a common plane disposed at an angle to the horizontal with the ends of these latter cross rods 46 disposed at the heel side of the conveyor 20 disposed below the ends of the cross rods 46 at the throat side thereof.

The end of the drive shaft 66 journaled in the bearing 70 on the bracket 69 projects outwardly therefrom and another sprocket wheel 85 is mounted thereon, Figs. 1 and 4. The sprocket wheel 85 is connected by a suitable chain 87, Figs. 1 and 4, to a power unit U, including a motor M and a suitable reduction gear unit R mounted on a base 88 on the leg 28 and the cross brace 33. The chain 87 is trained over the sprocket wheel 85 and a sprocket wheel 89 on the reduction gear unit R, and is effective to drive the shaft 66 and, therefore, the belt B upon operation of the motor M.

The sprocket wheels 61, 62, and 85 are secured to the shaft 66 for rotation therewith by suitable means, such as, keys, not shown. Similarly, the sprocket wheel 64 is keyed to the shaft 74 for rotation therewith. However, it has been found that by leaving one of the sprocket wheels on the tail end of the conveyor free to rotate on its shaft, improved adjustment of the belt B during the operation of the conveyor 20 is effected, and, therefore, the sprocket wheel 63 is not keyed to the shaft 74 but is freely rotatably mounted thereon between collars 91 and 92, Fig. 4, which are secured to the shaft 74 by suitable means such as pins 94, and retain the sprocket wheel 63 in proper position longitudinally of the shaft 74.

The upper pass P1 of the belt B, Figs. 2 and 11, comprises the conveying pass or run on which the work pieces such as bread pans, and the like, to be transported by the conveyor 20 are moved. The lower pass P2 comprises the return pass of the belt B.

As is best seen in Fig. 2, an elongated wear-strip 95 is mounted on the inner face of the vertical leg 41a of the angle bracket 41 in parallel longitudinally extending relation thereto, and affords an abutment member against which the inner, or throat, ends of the rods 46 may slide during movement of the upper pass P1 of the belts B along the brackets 36 and 41. The wear-strip 95 is preferably made of a strip of stainless steel, but may be made of other suitable material such as nylon fabric, and the like, and is removably secured in operative position on the leg 41a of the bracket 41 by the bolts 44 extending through the latter, the openings in the wear-strip 95 through which the bolts 44 extend being suitably countersunk whereby the heads of the bolts 44 do not protrude therefrom. With this construction the inner or throat surface of the supporting frame F, on which the rods 46 produce the greatest wear during operation of the conveyor, may be quickly, easily and economically replaced in a novel and expeditious manner when it becomes worn.

One of the novel features of my novel conveyor, and a feature which insures that work pieces will be fed onto and off from my conveyor in proper spaced relation to the other work pieces being transported by the conveyor belt B, and which enables work pieces to be effectively fed onto and off from straight-line conveyors which form substantially straight line extensions of the ends of the arc of a curved conveyor embodying my invention is the inclusion of rollers 96 and 98 at the head and tail end portions thereof, respectively, Figs. 1, 4, 5 and 6.

The roller 96 is journaled in the outer end portion of the brackets 68 and 69 on the head end of the conveyor 20, with the upper surface thereof disposed in substantially the same horizontal plane as the upper surface of the rods 46 affording the pass P1 of the belt B, between the sprocket wheel 61 and 62, and the sprocket wheels 63 and 64. The roller 96 is disposed outwardly of the sprocket wheels 61 and 62 in such spaced relation thereto that the work pieces being fed off from the belt B readily span the space between the roller 96 and the rod 46 positioned at the vertical center lines of the sprocket wheels 61 and 62, and may be fed from the belt B onto the roller 96 without dropping therebetween.

Similarly, a roller 98, Figs. 1 and 4, is journaled in the outer end portions of the brackets 76 and 77 on the tail end of the conveyor 20 with the upper surface thereof disposed in the same horizontal plane as the roller 96. The roller 98 is disposed outwardly of the sprocket wheels 63 and 64 in such spaced relation thereto that the work pieces being fed onto the belt B readily span the space between the rollers 98 and the rods 46 positioned at the upper vertical center lines of the sprocket wheels 63 and 64, and may be fed from the roller 98 onto the belt B without dropping therebetween.

The end portions 96a and 98a, Fig. 4, of the rollers 96 and 98 which are journaled in the brackets 69 and 76, respectively, are reduced in cross section whereby the main body portion of the rollers 96 and 98 are disposed in abutting relation to the inner faces of the brackets 69 and 76, respectively. Two collars 101 and 102 are mounted on the other end portions of the rollers 96 and 98 inwardly of the brackets 68 and 77, respectively, and in abutting relation thereto to thereby retain the rollers 96 and 98 in operative position in the brackets 68 and 69, and the brackets 76 and 77, respectively.

The end portion of the roller 96 on which the collar 101 is mounted projects outwardly from the brackets 68 and a sprocket wheel 104 is mounted thereon and is keyed thereto. The sprocket wheel 104 is connected by a suitable chain 105, Figs. 1 and 4, to a sprocket wheel 106, mounted on and keyed to an end portion of the drive shaft 66 which projects outwardly from the bearing 67 on the bracket 68. The ratio between the sprocket wheel 104 and the sprocket wheel 106 is such that the surface speed of the periphery of the roller 96 is equal to the surface speed of the upper pass P1 of the belt B.

Similarly, the end portion of the roller 98 on which the collar 102 is mounted, projects outwardly from the bracket 77 and a sprocket wheel 108 is mounted thereon and keyed thereto and is connected by a suitable chain 110 to a sprocket wheel 112 mounted on an end portion of the drive shaft 74 which projects outwardly from the bearing 83 on the bracket 77. The ratio between the sprocket wheel 108 and the sprocket wheel 112 is such that, like the roller 96, the surface speed of the roller 98 is equal to the surface speed of the upper pass P1 of the belt B.

The spacing of the roller 98 relative to the sprocket wheels 63 and 64 is such that work pieces being fed onto the conveyor 20 may be fed onto the roller 98 along a path directly perpendicular to the longitudinal axis of the roller 98 and the leading edge of the work pieces so fed onto the roller 98 are then advanced thereby onto the upper pass P1 of the belt B to make initial contact therewith at substantially the top path of travel of the rods 46 over the sprocket wheels 63 and 64.

Similarly, the spacing of the roller 96 relative to the sprocket wheels 61 and 62 is such that work pieces being fed off from the conveyor 20 are fed substantially horizontally outwardly from the top path of travel of the rods 46 over the sprocket wheels 61 and 62, and the leading edge of the work pieces engage the upper surface of the roller 96 before the work pieces have advanced sufficiently off from the belt B to have dropped appreciably from the horizontal plane of the aforementioned top path of travel of the rods 46 over the sprocket wheels 61 and 62.

With this construction, including the rollers 96 and 98, work pieces may be fed onto, transported by, and fed off from my novel conveyor 20 around any desired turn, including a true ninety degree turn, from and to truly horizontal straight-line conveyors while maintaining perfect spacing of the work pieces being handled.

Also, it will be seen that with this construction, the angle between the rollers 96 and 98, which determines the angular turn of the conveyor, may be accurately adjusted by properly adjusting the brackets 68 and 69 and the brackets 76 and 77 on the bolts 71, 72, 79 and 80, respectively, and that the effective angle of transportation of the conveyor 20, as thus determined is not affected by subsequent adjustments made on the belt B such as, for example, adjustments made to vary the tension thereof.

During an operation of my novel conveyor 20 the power unit U is effective through the sprocket wheel 89, the chain 87, and the shaft 66, to rotate the sprocket wheels 61 and 62 in a counter-clockwise direction, as viewed in Fig. 2, to thereby advance the belt B in a counter-clockwise direction and cause the upper pass P1 of the belt B to move from right to left, as viewed in Figs. 1 and 11.

The movement of the belt B is effective to rotate the sprocket wheels 63 and 64 and through the driving connection of the sprocket wheel 64 with the shaft 74, the latter is also caused to rotate and thereby through the connection of the sprocket wheel 112, the chain 110 and the sprocket wheel 108 rotate the roller 98. At the same time the rotation of the drive shaft 66 is effective through the connection of the sprocket wheel 106, the chain 105 and the sprocket wheel 104 to rotate the roller 96.

Thus, it will be seen that in a conveyor system wherein my novel curved conveyor 20 is used the bread pans or other articles to be conveyed may be fed by another suitable conveyor directly onto the roller 98 by which they are moved onto the pass P1 of the belt B at the tail end of the machine and are carried thereby toward the head end of the machine. During movement of the pass P1 of the belt B from the tail end of the machine toward the head end of the machine, it will be seen that the rods 46 disposed adjacent to each other are maintained in the same spaced relation by the links 48 and 49, and, therefore, the bread pans or other articles conveyed on the belt B are retained in the same spaced relation to each other as that in which they were fed onto the conveyor 20.

When the bread pans or other articles arrive at the head end of the conveyor 20, they pass from the upper pass P1 of the belt B onto the roller 96 just as the rods 46 passing over the sprocket wheels 61 and 62 start to move downwardly over the front peripheral edge of the sprocket wheels 62 and 63. In this manner, it will be seen that the same relative position of the articles being conveyed is maintained throughout the discharge of the articles from the conveyor 20 onto the receiving station or discharge station such as, for example, a straight line conveyor disposed perpendicularly to the roller 96.

The conveyor 20 for the sake of simplicity, has been shown in the drawings as merely a single-run machine, that is, a machine having only one conveyor belt B. However, it will be understood that this is for the purpose of illustration only, and that multiple-run conveyors embodying a plurality of conveyor belts B disposed one above the other, such as, for example, by mounting additional side rails 22 and 23 on extensions of the legs 27—31 may be constructed by those skilled in the art without departing from the purview of my invention.

From the foregoing, it will be seen that I have provided a novel conveyor which may be readily constructed and which is efficient and practical in operation.

In addition, it will be seen that I have afforded a novel conveyor wherein the conveyor belt is supported and driven in a novel and expeditious manner.

Also, it will be seen that I have provided a conveyor wherein work pieces may be fed onto, fed off from, and are transported thereby, in a novel and expeditious manner.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A conveyor comprising a supporting frame comprising two arcuate-shaped side rails disposed in horizontally-spaced and radially-spaced parallel relation to each other, a horizontally curved endless belt disposed between said side rails and having an upper pass and a lower pass, said belt comprising a plurality of rods disposed in laterally spaced relation to each other and extending substantially radially of the curve of said belt, and links interconnecting the corresponding ends of adjacent rods, means for supporting said belt between said side rails, said means comprising two parallel shafts journaled in said side rails at an angle to the horizontal and in parallel relation to each other, four sprocket wheels mounted on said shafts and disposed in operative engagement with said rods, each of said sprocket wheels being mounted on a respective end portion of one of said shafts, three of said sprocket wheels being operatively connected to said respective end portions on which it is mounted for rotation therewith, and the other of said sprocket wheels being freely rotatable on said respective end portion on which it is mounted, the upper peripheral edges of said sprocket wheels being disposed in a common horizontal plane, and means connected to one of said shafts for rotating the latter and thereby rotating said sprocket wheels and said belt.

2. A conveyor comprising a supporting frame comprising two arcuate-shaped side rails disposed in horizontally-spaced and radially-spaced parallel relation to each other, a horizontally curved endless belt disposed between said side rails and having an upper pass and a lower pass, said belt comprising a plurality of rods disposed in laterally spaced relation to each other and extending substantially radially of the horizontal curve of said belt, and links interconnecting the corresponding ends of adjacent rods, means for supporting said belt between said side rails, said means comprising two parallel track members mounted on and projecting inwardly from each of said side rails, rollers rotatably mounted on respective end portions of said rods and resting on respective ones of said track members, two shafts mounted on and extending between said side rails in spaced relation to each other, and two pairs of sprocket wheels mounted on said shafts, each of said pairs of sprocket wheels being mounted on a respective one of said shafts with each of said sprocket wheels mounted on a respective end portion of one of said shafts inwardly of said rollers mounted thereon and in direct engagement with rods of said belt, one pair of said wheels being operatively connected to said one shaft on which it is mounted, an elongated wear strip removably mounted on the inner face of the one of said side rails disposed at the inner side of said horizontal curve and extending along said one side rail in adjacent relation to an end of said rods, and means operatively connected to said one shaft for rotating the latter and thereby rotating said one pair of sprocket wheels and said belt.

3. A conveyor comprising a supporting frame comprising two arcuate-shaped side rails disposed in horizontally-spaced and radially-spaced parallel relation to each other, a horizontally curved endless belt disposed between said side rails and having an upper pass and a lower pass, said belt comprising a plurality of rods disposed in laterally spaced relation to each other and extending substantially radially of the horizontal curve of said belt, and links interconnecting the corresponding ends of adjacent rods, means for supporting said belt between said side rails, said means comprising rollers rotatably mounted on respective end portions of said rods inwardly of said links, two track members mounted on and projecting inwardly from each of said side rails in parallel spaced relation to each other and in supporting engagement with rollers mounted on rods disposed in respective ones of said passes, and four sprocket wheels journaled between said side rails between said upper and lower passes and in direct supporting engagement with rods in said belt inwardly of said rollers, and means operatively connected to two of said sprocket wheels for rotating the latter and thereby rotating said belt between said side rails.

4. A conveyor comprising a supporting frame comprising two arcuate-shaped side rails disposed in horizontally-spaced and radially-spaced parallel relation to each other, a horizontally curved endless belt disposed between said side rails and having an upper pass and a lower pass, said belt comprising a plurality of rods disposed in laterally spaced relation to each other and extending substantially radially of the horizontal curve of said belt, and one-piece substantially rigid links rotatably mounted on and interconnecting the corresponding ends of respective pairs of adjacent rods, means for supporting said belt between said side rails, said means comprising rollers rotatably mounted on respective end portions of said rods inwardly of said links, two pairs of track members mounted on and projecting inwardly from said side rails, each of said pairs of track members being mounted on a respective one of said side rails and extending longitudinally thereof with said track members in said pair being disposed in parallel vertically spaced relation to each other and disposed in supporting engagement with rollers on rods in a respective one of said passes, two shafts journaled on said side rails between said passes, and two pairs of sprocket wheels, each of said pairs of sprocket wheels being mounted on a respective one of said shafts with each of said sprocket wheels mounted on a respective end portion of said shaft and disposed in supporting engagement with rods in said upper pass inwardly of said rollers on said rods, one of said pairs of sprocket wheels being secured to one of said shafts for rotation therewith, one of said sprocket wheels in the other of said pairs being secured to the other of said shafts for rotation therewith, and the other of said sprocket wheels in said last mentioned pair being journaled on said last mentioned shaft for rotation relative thereto, and means connected to said first mentioned shaft for rotating the latter and thereby rotating said one pair of sprocket wheels and said belt.

5. A conveyor as defined in claim 4 and in which said two shafts are disposed at an angle to the horizontal in parallel spaced relation to each other, and in which the upper peripheral edge portions of said sprocket wheels are disposed in the same plane, and the upper pass of said belt between said two shafts is disposed in a horizontal plane.

ERNEST F. KOERBER.

REFERENCES CITED

The following references are of record in the file of this patent:

UNITED STATES PATENTS

| Number | Name | Date |
| --- | --- | --- |
| 36,121 | Wise | Apr. 5, 1862 |
| 591,388 | Dowden | Oct. 12, 1897 |
| 1,985,535 | De Wahl | Dec. 25, 1934 |